United States Patent
Zhang et al.

(10) Patent No.: US 10,057,805 B2
(45) Date of Patent: Aug. 21, 2018

(54) USE OF TRAFFIC LOAD REDUCTION INDICATOR FOR FACILITATING MOBILITY MANAGEMENT ENTITY OVERLOAD CONTROL FUNCTION

(71) Applicant: CISCO TECHNOLOGY, INC., San Jose, CA (US)

(72) Inventors: Yuyong Zhang, Nashua, NH (US); Indermeet Singh Gandhi, Bangalore (IN); Venkateswara Rao Soma, Bangalore (IN); Prashanth Narayana, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/452,489

(22) Filed: Mar. 7, 2017

(65) Prior Publication Data
US 2017/0181025 A1    Jun. 22, 2017

Related U.S. Application Data

(63) Continuation of application No. 14/736,082, filed on Jun. 10, 2015, now Pat. No. 9,603,044.

(51) Int. Cl.
*H04W 28/02* (2009.01)
*H04W 28/08* (2009.01)
(Continued)

(52) U.S. Cl.
CPC ......... *H04W 28/0226* (2013.01); *H04L 12/66* (2013.01); *H04W 28/0289* (2013.01);
(Continued)

(58) Field of Classification Search
None
See application file for complete search history.

(56) References Cited

U.S. PATENT DOCUMENTS

| 8,081,985 B2* | 12/2011 | Lopes | H04W 28/08 370/229 |
| 9,264,979 B2* | 2/2016 | Fong | H04W 48/12 |

(Continued)

OTHER PUBLICATIONS

European Telecommunications Standards Institute, "ETSI TS 136 413 V10.5.0 (Mar. 2012) Technical Specification: LTE; Evolved Universal Terrestrial Radio Access Network (E-UTRAN); S1 Application Protocol (S1AP) (3GPP TS 36.413 version 10.5.0 Release 10)" Technical Specification, ETSI TS 136 413 V10.5.0 (Mar. 2012), 262 pages.

(Continued)

*Primary Examiner* — Hong Cho
(74) *Attorney, Agent, or Firm* — Patterson + Sheridan, LLP

(57) ABSTRACT

In accordance with one example embodiment, there is provided a method that includes determining whether a received overload message includes a traffic load reduction indication element; determining a percentage of network elements to which to relay the received overload message if the received overload message includes the traffic load reduction indication element; and selecting ones of the network elements to which to send the received overload message based on the determined percentage. The method may further include modifying the received message to change a value of the traffic load reduction indication element; and sending the modified message to the selected ones of the network elements. In some embodiments, the received overload message includes a mobility management element ("MME") START message.

20 Claims, 5 Drawing Sheets

(51) Int. Cl.
*H04W 28/12* (2009.01)
*H04L 12/66* (2006.01)
*H04W 92/04* (2009.01)
*H04W 24/02* (2009.01)

(52) U.S. Cl.
CPC .......... *H04W 28/08* (2013.01); *H04W 28/12* (2013.01); *H04W 24/02* (2013.01); *H04W 92/045* (2013.01)

(56) References Cited

U.S. PATENT DOCUMENTS

| | | | |
|---|---|---|---|
| 9,363,813 B2* | 6/2016 | Tamura | H04W 72/0433 |
| 9,603,044 B2 | 3/2017 | Zhang | |
| 2011/0176530 A1 | 7/2011 | Vikberg et al. | |
| 2012/0069737 A1* | 3/2012 | Vikberg | H04W 28/12 |
| | | | 370/232 |
| 2013/0215742 A1 | 8/2013 | Sirotkin et al. | |
| 2014/0106790 A1* | 4/2014 | Kakinada | H04W 68/02 |
| | | | 455/458 |
| 2014/0148165 A1* | 5/2014 | Serravalle | H04W 16/14 |
| | | | 455/436 |
| 2014/0293964 A1 | 10/2014 | Park et al. | |
| 2014/0347990 A1* | 11/2014 | Chimbili | H04W 28/08 |
| | | | 370/235 |
| 2014/0357258 A1* | 12/2014 | Smith | H04L 41/0896 |
| | | | 455/423 |
| 2015/0023153 A1* | 1/2015 | Kashiwase | H04W 8/082 |
| | | | 370/221 |

OTHER PUBLICATIONS

European Telecommunications Standards Institute ETSI TS 123 401 V10.3.0 (Mar. 2011) Technical Specification: LTE; General Packet Radio Service (GPRS) enhancements for Evolved Universal Terrestrial Radio Access Network (E-UTRAN) access (3GPP TS 23.401 Version 10.3.0 Release 10) (Mar. 2011), 280 pages.

* cited by examiner

USE OF TRAFFIC LOAD REDUCTION INDICATOR FOR FACILITATING MOBILITY MANAGEMENT ENTITY OVERLOAD CONTROL FUNCTION

PRIORITY DATA

This application is a continuation (and claims the benefit of priority under 35 U.S.C. § 120) of U.S. application Ser. No. 14/736,082, filed on Jun. 10, 2015, entitled "USE OF TRAFFIC LOAD REDUCTION INDICATOR FOR FACILITATING MOBILITY MANAGEMENT ENTITY OVERLOAD CONTROL FUNCTION," Inventors Yuyong Zhang, et al. The disclosure of the prior application is considered part of (and is incorporated by reference into) the disclosure of this application.

TECHNICAL FIELD

This disclosure relates in general to the field of communications networks and, more particularly, to utilization of a traffic load reduction indicator for facilitating a mobility management entity ("MME") overload control function in such networks.

BACKGROUND

In 3GPP LTE small cell communications networks, an MME overload control function is provided. Using this function, a home e-Node B gateway ("HeNB-GW") can aggregate tens of thousands to millions of HeNBs. The HeNB-GW needs to forward overload START/STOP messages to all HeNBs. Therefore, even if an MME is lightly loaded, the HeNB-GW needs to send overload START/STOP messages to tens of thousands to millions of HeNBs, which greatly increases HeNB-GW processing load, as well as S1-MME interface signaling load in a short amount of time. As a result, HeNB-GW performance and availability is negatively impacted.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In accordance with one example embodiment, there is provided a method that includes determining whether a received overload message includes a traffic load reduction indication element; determining a percentage of network elements to which to relay the received overload message if the received overload message includes the traffic load reduction indication element; and selecting ones of the network elements to which to send the received overload message based on the determined percentage. The method may further include modifying the received message to change a value of the traffic load reduction indication element; and sending the modified message to the selected ones of the network elements. In some embodiments, the received overload message includes a mobility management element ("MME") START message. The method may further include sending the received overload message to all of the network elements if the received overload message does not include the traffic load reduction indication element. In some embodiments, the method includes sending the received overload message to a configurable percentage of the network elements if the received overload message does not include the traffic load reduction indication element.

Each of the network elements may be a Home eNodeB ("HeNB"). The method may further include, prior to the determining whether the received overload message includes a traffic load reduction indication element, receiving at a gateway element the overload message. The gateway element may be an HeNB gateway disposed between an MME and the network elements. In certain embodiments, upon receipt of the modified overload message, the selected network elements perform traffic filtering based on the modified overload message.

Example Embodiments

Figure 1:
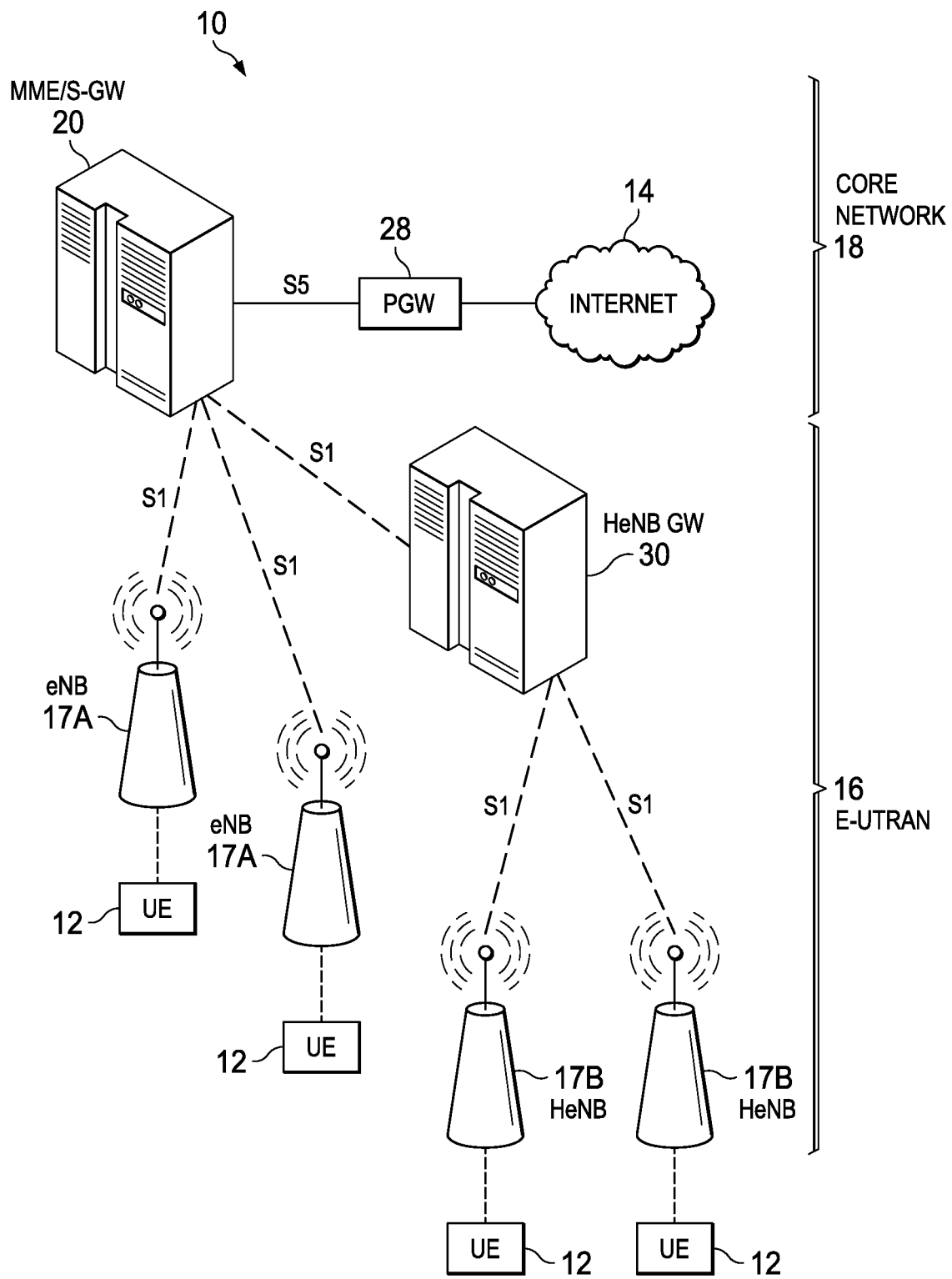
FIG. 1 is a simplified block diagram of a portion of a network communications environment for utilizing a traffic load reduction indicator for facilitating an MME overload control function in accordance with embodiments described herein.

Turning to FIG. 1, FIG. 1 is a simplified block diagram of a portion of a communications network 10 for implementing a traffic load reduction indicator for assisting a mobility management entity ("MME") overload control function in such networks. In one embodiment, at least a portion of the network 10 is implemented as a Long Term Evolution ("LTE") network. As illustrated in FIG. 1, the network 10 enables one or more user equipment ("UE"), represented in FIG. 1 by UE 12, to be connected to communicate data to and from the Internet 14 via a radio access network ("RAN") 16 comprising a plurality of RAN nodes, represented in FIG. 1 by eNBs 17A and HeNBs 17B, and a core network 18. In the illustrated embodiment, the RAN 16 is implemented as an E-UTRAN. In one embodiment, the core network 18 may be implemented using an Evolved Packet Core ("EPC") network as defined in 3GPP TS 23.401 and employing a user plane protocol GTPv1-U. It will be understood, however, that other implementations of the core network 18 may be employed in accordance with the features described herein.

As illustrated in FIG. 1, the core network 18 may include a mobility management entity ("MME") 20, which is responsible for control plane functions related to subscriber and session management and is connected to a home subscriber service ("HSS") (not shown), which supports a database that includes user subscription information, through an S6a interface. The core network 18 may further include a serving GPRS support node (not shown) connected to the MME 20 via an S3 interface for providing functionality related to packet-data switching.

The core network 18 may further include a serving gateway ("S-GW"), which in the illustrated embodiment is co-located with the MME 20 and which serves as the termination point of the user plane interface S1-U toward the RAN network 16, and a PDN gateway ("PGW") 28, which serves as an interface to the Internet 14, sending user data from the user toward the Internet and receiving data destined for the user from the Internet. In addition, the PGW 28 supports policy enforcement features that apply operator-defined rules for resource allocation and usage, as well as packet filtering and inspection and charging support. The PGW 28 may interface with a policy charging rule function ("PCRF") (not shown), which manages the service policy and provides QoS information for each user session. It will be recognized that the core network 18 may provide a variety of functionality in the network 10, including, for example, one or more of aggregation, user authentication, call control and switching, accounting and charging, service invocation, and gateways.

As previously noted, in one embodiment, the network 10 is implemented in accordance with the Long-Term Evolution ("LTE") standard. E-UTRAN provides the radio access in the LTE network and is designed to improve end-user throughputs and sector capacity and reduce user plan latency, bringing significantly improved user experience with full mobility. With the emergence of IP as the protocol of choice for all types of traffic, LTE provides support for IP-based traffic with end-to-end QoS. E-UTRAN supports various types of services, including web browsing, FTP, video streaming, VoIP, online gaming, real time video, push-to-talk, and push-to-view, for example.

UE 12 can be associated with clients, customers, or end users wishing to initiate a communication in communication network 10 via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication network 10. UE 12 may also be inclusive of a suitable interface to the human user, such as a microphone, a display, or a keyboard or other terminal equipment. UE 12 may also be any device that seeks to initiate a communication on behalf of another entity or element, such as a program, a database, or any other component, device, element, or object capable of initiating an exchange within communication network 10. Data, as used herein in this document, refers to any type of numeric, voice, video, media, or script data, or any type of source or object code, or any other suitable information in any appropriate format that may be communicated from one point to another. On power up, UE 12 can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

In general terms, S-GW portion of MME/S-GW 20 is can be configured to route and to forward user data packets, while also acting as the mobility anchor for the user plane during inter-eNodeB handovers. Additionally, S-GW can act as the anchor for mobility between LTE and other 3GPP technologies. MME portion of MME/S-GW 20 can be configured to operate as a control node for the LTE access-network. It further can be responsible for idle mode UE tracking and paging procedures (including, for example, retransmissions). Furthermore, MME 20 can be involved in the bearer activation/deactivation process and can be responsible for choosing S-GW for UE 12 at the initial attach (and at time of an intra-LTE handover involving core network node relocation). MME 20 can also be responsible for authenticating the user by interacting with HSS 22. MME 20 also provides the control plane function for mobility between LTE and 2G/3G access networks.

Other functions of the MME 20 may include generating and allocating temporary identities to UEs, terminating Non-Access Stratum ("NAS") signaling, checking the authorization of UE 12 to camp on a service provider's Public Land Mobile Network ("PLMN"), and enforcing UE roaming restrictions. MME 20 serves as the termination point in the network for ciphering/integrity protection for NAS signaling and handles the security key management. Lawful interception of signaling is also supported by MME 20.

In regard to particular applications involving UE 12, media servers comprising one or more video servers may be provided, which can provide streaming video to an individual associated with UE 12 via the Internet 14. For example, an individual could be uploading (or streaming) video over the network to which UE 12 is connected. This could involve technologies such as flip video, webcams, YouTube, and various other video technologies involving any type of uploading and/or streaming video data.

For purposes of illustrating certain example techniques of communication network 10, it is important to understand the communications, including control signals, that may be traversing the network and the overload situations that can occur at various points in the network 10 due to such communications. It will be understood that, after a subscriber data session has been established in a conventional fashion between the UE 12 and the Internet 14, data packets from the UE 12 are encapsulated by the RAN node 17 in accordance with GTPv1-U and forwarded on to S-GW and PGW. The S-GW and PGW decapsulates the user data packets from GTPv1-U tunnel between the RAN node 17 and the S-GW and PGW and forwards them to Internet 14. Conversely, data packets intended for the UE 12 are transmitted to the UE from the Internet 14 via the S-GW and PGW, which encapsulates the same in accordance in GTPv1-U tunnel towards the RAN node, and the RAN node 17 decapsulates the data packets upon receipt thereof.

The LTE standard includes a radio access network that employ a technology called evolved universal terrestrial radio access network ("EUTRAN") for communicating UEs and a System Architecture Evolution ("SAE") core network. As part of the EUTRAN, an eNB provides a wireless air interface for bridging UEs to the SAE core network over a wired connection. The SAE core network includes management gateways such as the MME, forwarding gateways such as the S-GW, and PGWs.

In operation, when UE 12 requests IP services, an IP connectivity access network bearer, or evolved packet switch ("EPS") bearer, is required to provide connectivity from UE to S-GW and back, effectively establishing an end-to-end IP path associated with a specific QoS. Parts of the EPS bearer may use IP tunneling. The EPS bearer is similar to a packet data protocol ("PDP") context in the general packet radio service ("GPRS") core network and includes a radio bearer between UE 12 and E-UTRAN 16, an S1 bearer between E-UTRAN 16 and S-GW 20, and an S5/S8 bearer between S-GW and PGW. A generic IP tunnel or IP path may substitute for a bearer in some embodiments.

The EPS bearer includes a data structure maintained by MME/S-GW 20, which includes subscriber information and session information for identifying the traffic flow carried by the bearer. When data is delivered from the core network to S-GW, S-GW uses bearer information to direct the incoming packets to the correct UE, such as UE 12. UE 12 likewise attaches bearer information to IP traffic bound for the core network, which S-GW uses to maintain IP sessions and direct packets to their destinations. The bearer also carries QoS information that applies to the traffic flow carried by the bearer.

When UE 12 initially attaches to E-UTRAN 16, UE 12 requests IP connectivity, and a bearer may be allocated by MME/S-GW 20 for providing IP services. The bearer is created, allocated, and tracked by MME 20 so that when UE 12 moves from one RAN to another, it can maintain the same bearer at MME 20. Data is sent via the bearer in conjunction with a S1-U tunnel from S-GW 20 to attached RAN node 17. If UE 12 goes idle, RAN node 17 and S-GW 20 are permitted to deallocate radio resources.

Downlink data paging is the process by which an inactive, or idle, UE is contacted to receive data from an upstream source over the packet data network. A UE that is in an active state is associated with an eNB and has at least one active bearer. When the UE goes inactive, such as when it enters a low power mode, it releases all bearers. To locate an inactive UE, MME 20 issues paging requests to multiple eNBs, which is typically an expensive operation.

When data arrives at S-GW 20 for UE 12, S-GW may inform the relevant MME, in this case, MME 20, that data has arrived using a downlink data notification (DDN) message. Subsequently, MME 20 may page inactive UE 12 and, if requested by UE 12, reestablish an S1-U tunnel from S-GW 20 to eNB 17 by triggering a Modify Bearer Request (MBRq) message toward S-GW. The data may then be requested by UE 12 and retrieved from S-GW 20 over the preexisting bearer. A DDN message need not be sent by S-GW to the MME 20 every time new downstream data is received at S-GW 20. Instead, once a DDN message is sent, S-GW 20 typically does not send another DDN but instead waits for MME 20 to respond with a message indicating that the DDN message has been received. This message may be a MBRq message or a DDN Acknowledgement (ACK) message. Once the DDN message has been acknowledged, S-GW 20 does not need to send additional DDN messages until a delay value timer has expired, indicating that a new DDN message should be sent. The delay value timer has a value which may be provided by MME 20 in a DDN ACK message, as described below, and which may be specific to UE 12 or to the particular packet data network that is the source of the incoming traffic.

In situations in which MME 20 is overloaded, MME may not receive DDN messages from S-GW 20, which may also be overloaded; it may not page all the UEs for which it has received DDN messages; and/or it may fail to respond to S-GW with DDN ACK messages. MME may also become unable to page a UE during emergency events with the appropriate messages, e.g., Emergency Calls or Amber Alerts. Clearly, therefore, it is undesirable to permit overloading of an MME. In some embodiments, LTE and the GPRS tunneling protocol ("GTP"), which incorporate a QoS model for EPS bearers. Each EPS bearer is associated with and identified by bearer level QoS parameters, including a QoS Class Identifier ("QCI") and Allocation and Retention Priority ("ARP"). The QCI is a scalar that is used as a reference to access node-specific parameters that control bearer level packet forwarding treatment, such as scheduling weights, admission thresholds, queue management thresholds, link layer protocol configuration, for example, and that have been preconfigured by the operator that owns the access node (e.g., eNB).

The ARP contains information about priority level (in the form of a scalar), preemption capability (in the form of a flag), and preemption vulnerability (in the form of a flag) of the bearer. The primary purpose of the ARP is to determine whether a bearer establishment/modification request can be accepted or needs to be rejected in case of resource limitations, such as available radio capacity, in the case of guaranteed bit rate ("GBR") bearers. The priority level information of the ARP is used for this decision to ensure that the request of the bearer with the higher priority is preferred. Additionally, the ARP can be used (e.g., by the eNB) to determine which bearer(s) to drop during periods of exceptional resource limitation (e.g., at handover). The preemption capability information of the ARP is used to decide whether a bearer with a lower ARP priority level should be dropped to free up the required resources. The preemption vulnerability information of the ARP is used to decide whether a bearer is a candidate for such dropping by a preemption capable bearer with a higher ARP priority value. Once successfully established, a bearer's ARP does not have any impact on the bearer level packet forwarding treatment (e.g., scheduling and rate control), which is determined solely by the other EPS bearer QoS parameters, including QCI, GBR, and maximum bit rate ("MBR"), and by the aggregate MBR ("AMBR") parameters. The ARP is not included within the EPS QoS Profile sent to the UE.

In one embodiment, the value of the ARP priority level may be in a range of integers 1-15 and may be implemented to include a bearer priority value, with a value of 1 corresponding to the highest priority and a value of 15 corresponding to the lowest priority. For messaging from the MME to the S-GW, the ARP may be included as a parameter in the DDN ACK message. In some embodiments, if a bearer priority is not provided by the MME, a default bearer priority will be applied.

It will be recognized, that, as provided for in "LTE: General Packet Radio Service (GPRS) enhancements for Evolved Universal Terrestrial Radio Access Network (E-UTRAN) access (3GPP TS 23.401 version 10.8.0 Release 10)," under certain circumstances, such as when MME load or eNB load exceeds an operator configured threshold, as will be described, an MME may be configured to restrict the signaling load that S-GW is imposing on it via DDNs. For example, the MME can reject DDN requests for low priority traffic for UEs in idle mode. To further offload the MME, the MME can request S-GW selectively to reduce the number of DDN requests it sends for low priority downlink traffic received for UEs in idle mode according to a throttling factor ("TF") for a period of time designated a throttling delay ("TD"). The TF and TD are specified in a DDN ACK message from MME to S-GW.

Referring again to FIG. 1, an HeNB-GW 30 is an HeNB network access concentrator used to control capabilities necessary for managing large clusters of HeNBs, such as HeNBs 17B. The HeNB-GW 30 aggregates the HeNBs into a single network element and then connects to the LTE core network 18. The primary function of HeNBs 17B is to facilitate simple, seamless, and highly secure access to UEs as they roam between trusted/secure mobile networks and untrusted/insecure public networks.

Figure 2A:
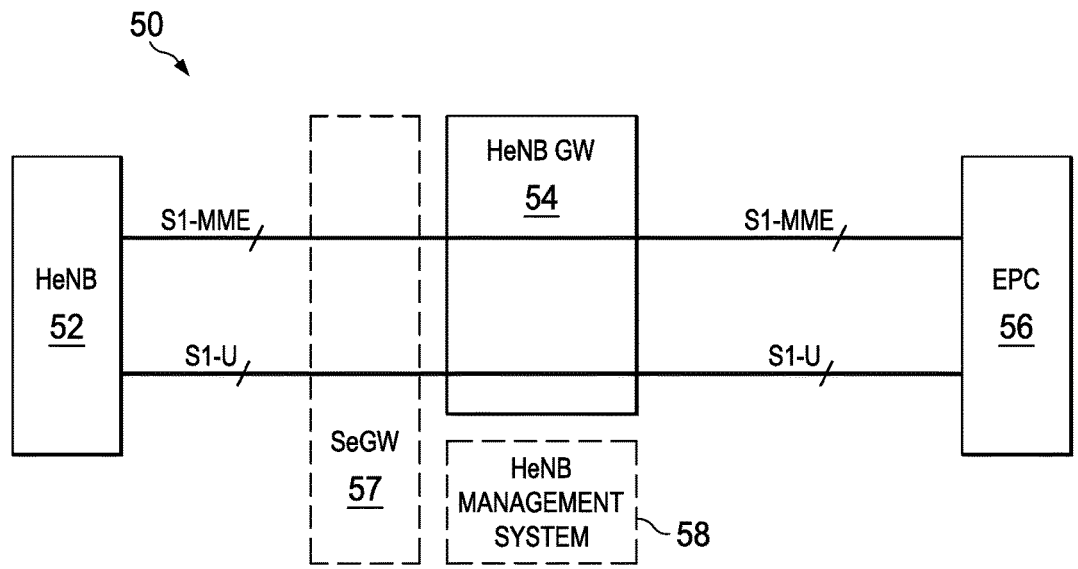
FIG. 2A is a simplified block diagram of an LTE small cell network including an HeNB-GW for providing access by an HeNB to a core network in accordance with embodiments described herein.

FIG. 2A illustrates a simplified block diagram of an LTE small cell network 50 including an HeNB (also referred to as a "femtocell") 52 and an HeNB-GW 54 that provides access to a core network 56. As shown in FIG. 2A, an S1 interface is defined as an interface between HeNB-GW 54 and the core network 56, between the HeNB 52 and the HeNB-GW 54, and between the HeNB 52 and the core network 56. HeNB-GW 54 provides standards-based S1-MME and S1-U network interfaces. As shown in FIG. 2, the HeNB-GW 54 appears to the MME of the core network 56 as an eNB and appears to the HeNB 52 as an MME. The S1 interface is provided between the HeNB 52 and the core network 56 whether or not the HeNB is connected to the core network via the HeNB-GW 54. In accordance with 3GPP LTE standards, the HeNB-GW 54 provides a variety of functions, including relaying UE-associated S1 application part messages between the MME serving the UE and the HeNB serving the UE; terminating non-UE associated S1 application part procedures toward the HeNB and the MME; optionally terminating the S1-U interface with the HeNB and the S-GW; supporting tracking area code ("TAC") and PLMN ID used by the HeNB; allowing no X2 interface establishment between the HeNB-GW and other nodes, and optionally performing paging optimization in case the allowed closed subscriber group ("CSG") list for the paged UE is included in the PAGING message. MME hosts a variety of functions to support HeNB-GW, including CSG reporting to S-GW/P-GW; access control for UEs that are members of the CSG; and optionally performing paging optimization. The network 50 may further include a security gateway ("Se-GW") 57, an HeNB Management System ("HeMS") 58, and a CSG List Server (not shown).

Figure 2B:
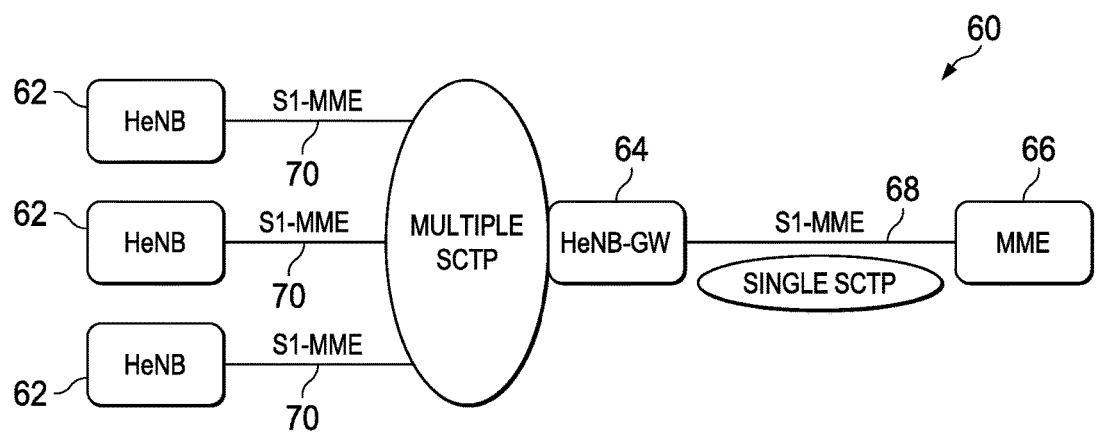
FIG. 2B is a simplified block diagram illustrating S1-MME aggregation functionality of a HeNB access network including an HeNB-GW and one or more HeNBs in accordance with embodiments described herein.

FIG. 2B is a simplified block diagram illustrating S1-MME aggregation functionality of a HeNB access network 60 in accordance with embodiments described herein. In the embodiment illustrated in FIG. 2B, the HeNB access network may include one or more HeNBs 62, an Se-GW 57 (FIG. 2A), an HeNB-GW 64, an HeMS 58 (FIG. 2A) and a CSG List Server (not shown). Each of the HeNBs 62 is customer premises equipment that offers Uu interface to UE and S1 interface over an IPsec tunnel to HeNB-GW 64for accessing LTE core network. In accordance with certain embodiment, an HeNB is directly connected to one and only one HeNB-GW. A SeGW is a logical function on the HeNB-GW 64 and may be implemented as either a separate physical entity or may be collocated with an existing entity. The SeGW secures the communication from/to the HeNBs 62. SeGW also authenticates HeNBs 62, terminates encrypted IPsec data connections from HeNBs, and provides access to HeMS and HeNB-GW 64. The HeNB-GW 64 provides access to the core network. It acts as an access gateway to each HeNB 62 and concentrates connections from a large number of HeNBs. HeNB-GW 64 services as a control plane concentrator specifically for the S1-MME interface to an MME 66. The HeNB-GW 64 may optionally terminate the user plane toward the HeNB 62 and toward the S-GW (FIG. 1) and may provide a relay function for relaying user plane data between the HeNB and the S-GW (FIG. 1).

As illustrated in FIG. 2B, HeNB-GW 64 functions as an aggregation point between HeNBs 62 and MME 66. In particular, HeNB-GW 64 provides a single Stream Control Transmission Protocol ("SCTP") connection 68 toward the MME 66 and a single SCTP connection 70 to each HeNB 62. HeNB-GW 64 functions to hide HeNB SCTP connections 70 from the MME 66. This reduces the number of SCTP connections to be handled by the MME 66, reduces SCTP capacity load on MME 66, reduces SCTP heartbeat load on MME, and eliminates maintenance of a large number of SCTP associations, as well as the frequent establishment and release of such associations, by MME.

In accordance with 3GPP 23.401, the MME 66 includes mechanisms for avoiding and handling overload situations, which may include the use of NAS signaling to reject NAS requests from UEs. Additionally, under certain circumstances, the MME may restrict the load that eNBs connected thereto are generating on it. This can be achieved by the MME invoking the S1 interface overload procedure to a proportion of the eNBs with which the MME has S1 interface connections. To reflect the amount of load that the MME wishes to reduce, the MME can adjust the proportion of eNBs which are sent an S1 interface OVERLOAD START message, and the content of the OVERLOAD START message. The MME should select the eNBs at random so that if two MMEs within a pool are overloaded, they do not both send OVERLOAD START messages to the exact same set of eNBs. Using the OVERLOAD START message, the MME can request an eNB to reject all Radio Resource Control ("RRC") connection requests that are for non-emergency and non-high priority mobile originated services; reject all new RRC connection requests for EPS Mobility Management signaling (e.g. for TA Updates) for that MME; only permit RRC connection requests for emergency sessions and mobile terminated services for that MME; or only permit RRC connection requests for high priority sessions and mobile terminated services for that MME.

When rejecting an RRC connection request for overload reasons the eNB indicates to the UE an appropriate timer value that functions to limit additional RRC connection requests during that time period. In addition, the MME can request the eNB to restrict the load from subcategories of UEs. These subcategories include UEs that reselect from other PLMNs ("PLMN type") and all UEs using low access priority for the radio access. PLMN type barring can for example be used to protect a VPLMN from an overload caused by the failure of one (or more) other networks in that country and accesses made from roaming subscribers. If an MME invokes the S1 interface overload procedure for a subcategory of UEs, the MME should select all eNBs with which the MME has S1 interface connections. Alternatively, the selected eNBs may be limited to a subset of the eNBs with which the MME has an S1 interface connection. During an overload situation, the MME should attempt to maintain support for emergency bearer services. When the MME has recovered and wishes to increase its load for a particular subcategory, the MME sends an OVERLOAD STOP messages to the eNB(s), specifying the subcategory or subcategories of UEs in connection with which to lift restrictions.

In accordance with embodiments described herein, on receiving an MME OVEROAD START message, an HeNB-GW, such as HeNB-GW 30, uses a Traffic Load Reduction Indication IE of the OVERLOAD START message to determine the percentage of HeNBs attached to the same logical eNB that receives the message to which the OVERLOAD START message needs to be relayed. It will be recognized that the logical eNB behaves as a virtual eNB toward the MME. In particular, as defined in 3GPP TS 36.413, the Traffic Load Reduction Indication IE indicates the percentage of the type of traffic relative to the instantaneous incoming rate at the eNB (as indicated in an Overload Action IE of the OVERLOAD START message), to be rejected If the TLRI IE is not present in the OVERLOAD START message, the HeNB-GW will relay the message to a configurable percentage of HeNBs. A logic eNB of the HeNB-GW will create an overload control HeNB List ("OCHL") per MME for all HeNBs to which the OVERLOAD START message has been relayed so that subsequent OVERLOAD START/STOP messages can be correlated. Additionally, if HeNB-GW logic eNB receives another OVERLOAD START message from the same MME before receiving an OVERLOAD STOP message, if there is a TLRI IE and the percentage is changed from the previous OVERLOAD START message, the HeNB-GW calculates the difference and either relays the message to more HeNBs (adding to the OCHL) or sends an OVERLOAD STOP message to a subset of HeNBs in OCHL. The number of HeNBs in OCHL will match the new percentage. Otherwise, if the newly received OVERLOAD START message has the same actions, the new message will be dropped by the HeNB-GW. If the newly received OVERLOAD START message has different actions, the new message will be forwarded to the newly adjusted HeNBs in OCHL.

Figure 3:
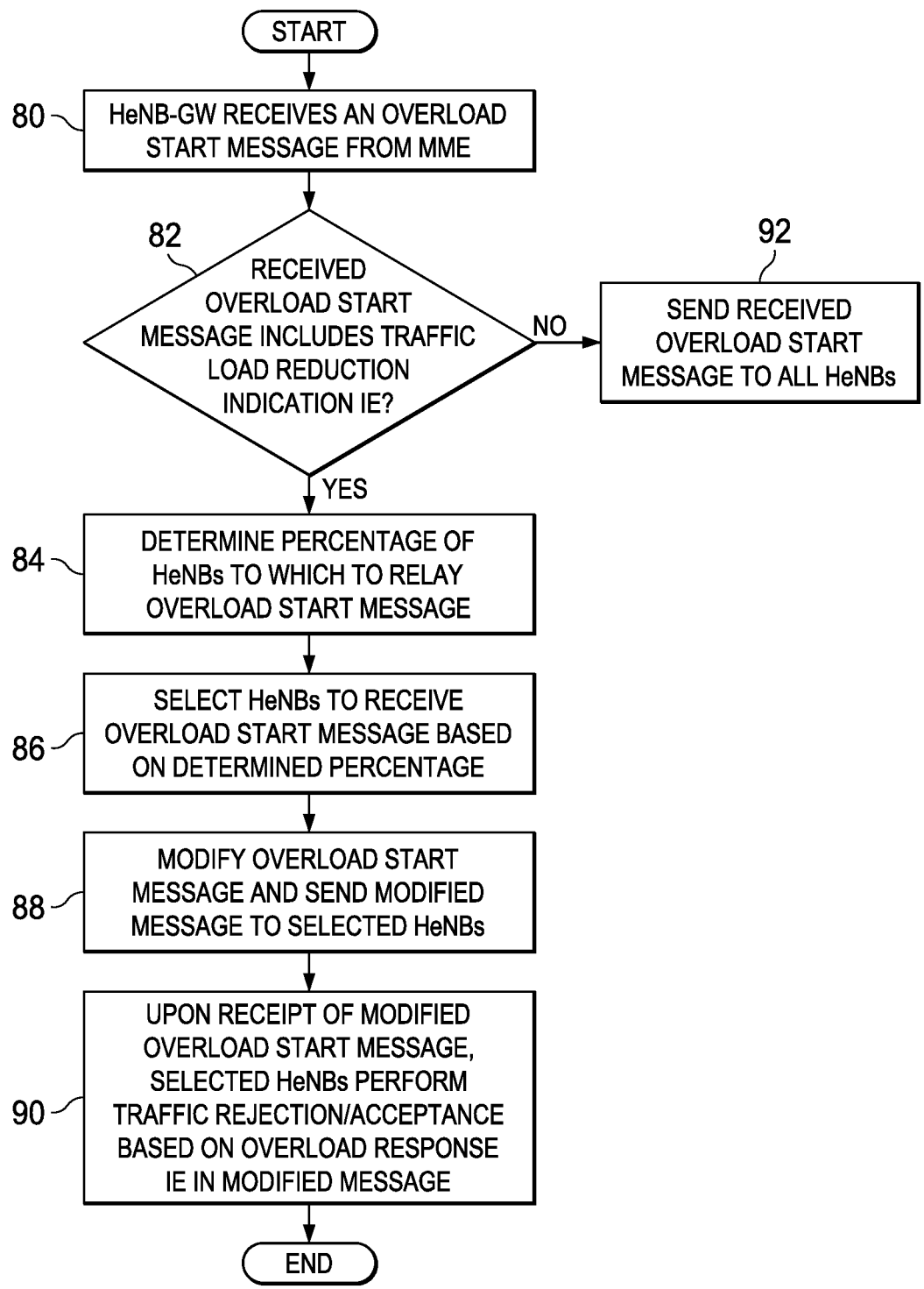
FIG. 3 is a flowchart illustrating operations for utilizing a traffic load reduction indicator for facilitating an MME overload control function in accordance with embodiments described herein.

Turning now to FIG. 3, illustrated therein is a flowchart of a method for using MME OVERLOAD START Traffic Load Reduction Indicator IE for assisting the MME perform overload control functions in accordance with embodiments described herein. Referring to FIG. 3, in step 80, HeNB-GW receives an MME OVERLOAD START message. In step 82, a determination is made whether the received OVERLOAD START message includes a Traffic Load Reduction Indication IE. If a positive determination is made in step 82, in step 84, HeNB-GW uses the Traffic Load Reduction Indication IE to determine the percentage of HeNBs to which the OVERLOAD START message needs to be relayed. This is different than previous solutions, in which the HeNB-GW would merely relay the OVERLOAD START message to all HeNBs. In step 86, HeNB-GW selects HeNBs to receive the OVERLOAD START message. In one embodiment, selection of HeNBs by the HeNB-GW is purely random, similar to MME selection of eNBs. In step 88, once the HeNBs are selected by the HeNB-GW, the Traffic Load Reduction Indication IE in the OVERLOAD START message is modified to 99% so that selected HeNBs do not take further action based on the IE and the modified OVERLOAD START message is sent to the selected HeNBs. In step 90, upon receipt of the modified OVERLOAD START message, the selected HeNBs perform traffic rejection/acceptance based on an Overload Response IE in the modified OVERLOAD START message. If a negative determination is made in step 82, execution proceeds to step 92, in which the OVERLOAD START message received from the MME is relayed by the HeNB-GW to all (or a configurable percentage) of the HeNBs.

Figure 4:
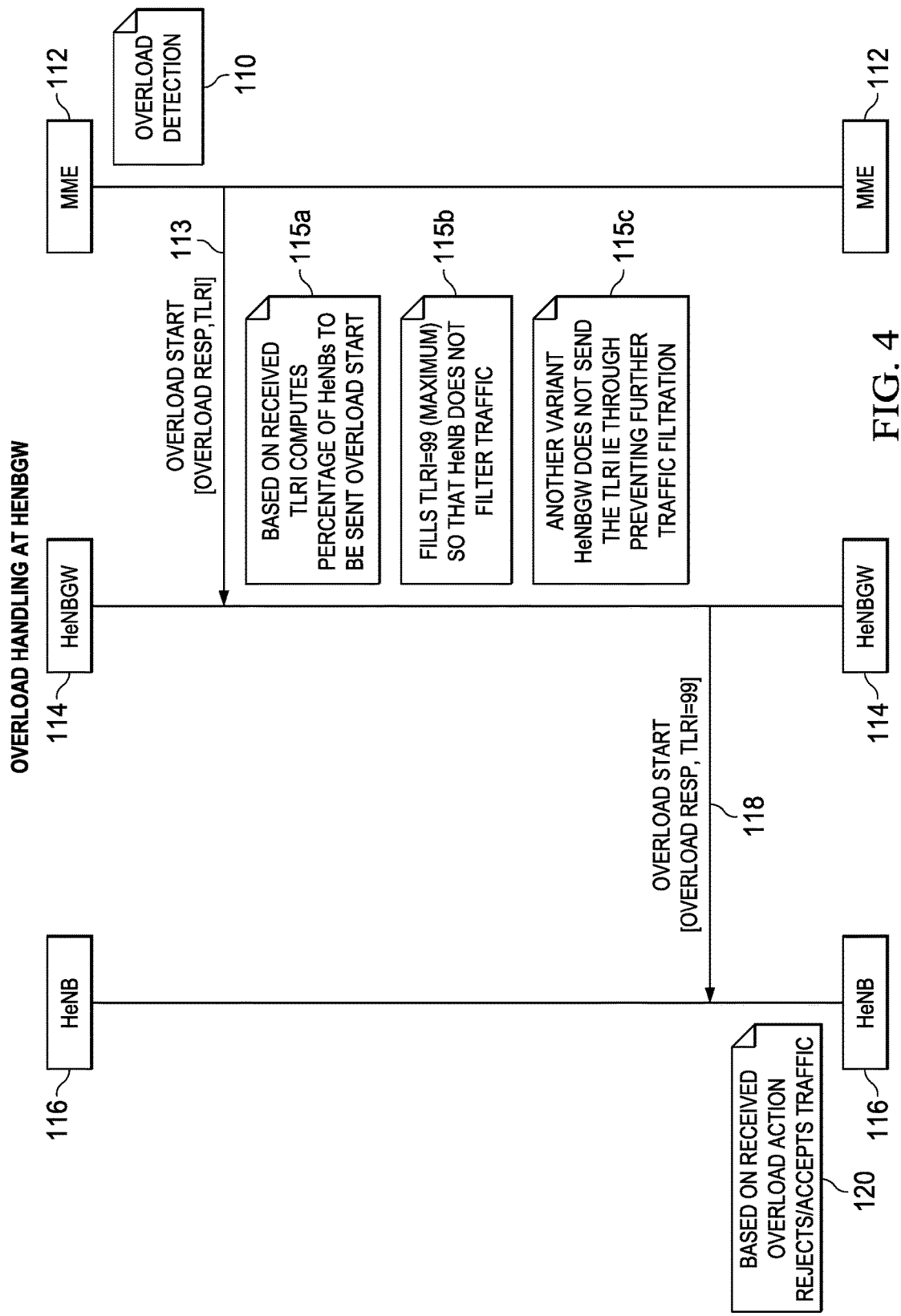
FIG. 4 is a flow diagram operations for utilizing a traffic load reduction indicator for facilitating an MME overload control function in accordance with embodiments described herein.

Referring now to FIG. 4, a flow diagram of a method for using MME OVERLOAD START Traffic Load Reduction Indicator IE for assisting the MME perform overload control functions in accordance with embodiments described herein is depicted. As shown in FIG. 4, upon overload detection 110 at an MME 112, an OVERLOAD START message (which includes an Overload Response IE and a Traffic Load Rejection Indication IE) 113 is sent to an HeNB-GW 114. As previously noted, upon receipt of the OVERLOAD START message 113, the HeNB-GW 114 computes the percentage of HeNBs to be sent the OVERLOAD START message based on the received Traffic Load Rejection Indication IE (115a), modifies the Traffic Load Rejection Indication IE to the maximum value (99) so that the HeNB does not filter traffic (115B), and forwards the modified OVERLOAD START message to select HeNBs, represented in FIG. 4 by an HeNB 116 (115c). In an alternative embedment, the HeNB-GW 114 modifies the OVERLOAD START message by deleting the Traffic Load Rejection Indication IE from the message altogether before sending it to the selected HeNBs. Upon receipt of the modified OVERLOAD START message 118, the HeNB 116 accepts/rejects traffic based on the Overload Action IE included in the message 118 (120).

Embodiments described herein mitigate the performance impact on HeNB-GWs upon receipt of an MME OVERLOAD START/STOP message by requiring that each HeNB-GW send the message only to a percentage (based on the value of the Traffic Load Reduction Indication IE) of randomly-selected HeNBs connected to the HeNB-GW. The result is functionally equivalent to 3GPP-defined MME overload control. In particular:

(#HeNBs)*(percentage of signaling reduction)=
    (#HeNBs)*(TLRI IE percentage)*(99% signaling reduction)

Additionally, embodiment described herein reduce backhaul signaling load on an S1 interface between HeNBs and HeNB-GW, reduces HeNB-GW signaling processing load, and reduces overall HeNB overload control processing load in the HeNB. Only selected HeNBs have to perform traffic rejection/acceptance rather than all HeNBs in the network based on the Overload Action IE.

Figure 5:
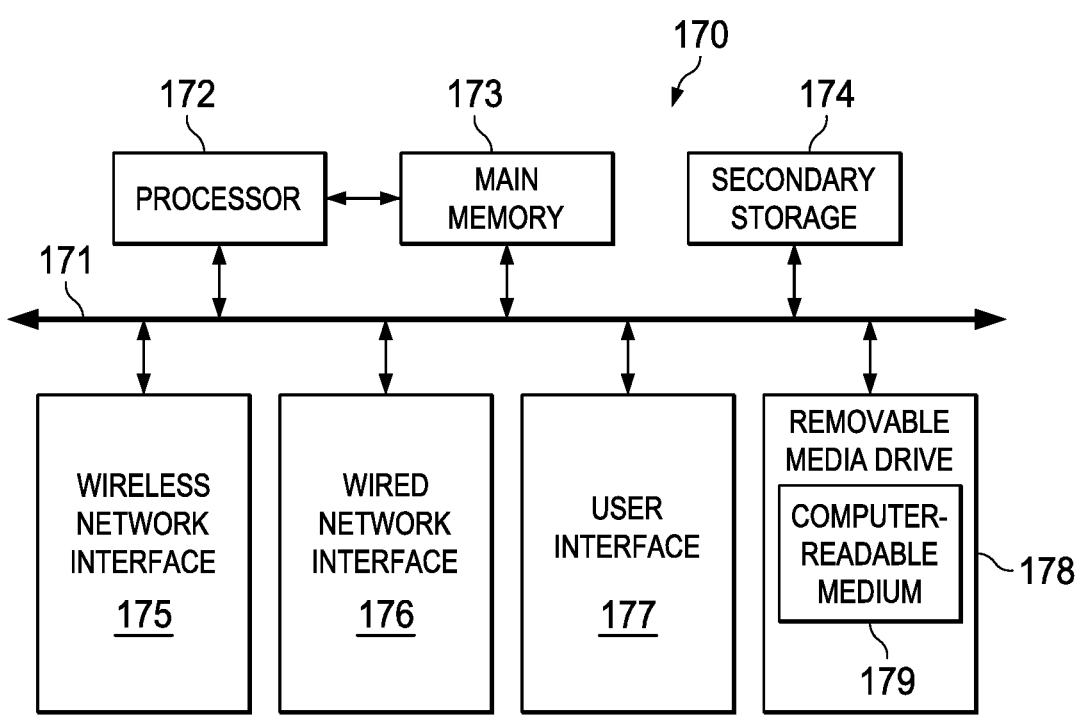
FIG. 5 is a simplified block diagram of a machine comprising an element of the network communications environment of FIG. 1 for utilizing a traffic load reduction indicator for facilitating an MME overload control function in accordance with embodiments described herein.

Turning to FIG. 5, FIG. 5 is a simplified block diagram of an example machine (or apparatus) 170 that may be implemented as an element of a system for use in implementing a technique in accordance with embodiments described herein. The example machine 170 corresponds to network elements and computing devices that may be deployed in network 10, including, for example, HeNB-GWs 30, 54, 64, and/or 114. In particular, FIG. 5 illustrates a block diagram representation of an example form of a machine within which software and hardware cause machine 170 to perform any one or more of the activities or operations discussed herein. As shown in FIG. 5, machine 170 may include a processor 172, a main memory 173, secondary storage 174, a wireless network interface 175, a wired network interface 176, a user interface 177, and a removable media drive 178 including a computer-readable medium 179. A bus 171, such as a system bus and a memory bus, may provide electronic communication between processor 172 and the memory, drives, interfaces, and other components of machine 170.

Processor 172, which may also be referred to as a central processing unit ("CPU"), can include any general or special-purpose processor capable of executing machine readable instructions and performing operations on data as instructed by the machine readable instructions. Main memory 173 may be directly accessible to processor 172 for accessing machine instructions and may be in the form of random access memory ("RAM") or any type of dynamic storage (e.g., dynamic random access memory ("DRAM")). Secondary storage 174 can be any non-volatile memory such as a hard disk, which is capable of storing electronic data including executable software files. Externally stored electronic data may be provided to computer 170 through one or more removable media drives 178, which may be configured to receive any type of external media such as compact discs ("CDs"), digital video discs ("DVDs"), flash drives, external hard drives, etc.

Wireless and wired network interfaces 175 and 176 can be provided to enable electronic communication between machine 170 and other machines via networks (e.g., control plane 108, data plane 110. In one example, wireless network interface 175 could include a wireless network controller ("WNIC") with suitable transmitting and receiving components, such as transceivers, for wirelessly communicating within a network. Wired network interface 176 can enable machine 170 to physically connect to a network by a wire line such as an Ethernet cable. Both wireless and wired network interfaces 175 and 176 may be configured to facilitate communications using suitable communication protocols such as, for example, Internet Protocol Suite ("TCP/IP"). Machine 170 is shown with both wireless and wired network interfaces 175 and 176 for illustrative purposes only. While one or more wireless and hardwire interfaces may be provided in machine 170, or externally connected to machine 170, only one connection option is needed to enable connection of machine 170 to a network.

A user interface 177 may be provided in some machines to allow a user to interact with the machine 170. User interface 177 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 178 represents a drive configured to receive any type of external computer-readable media (e.g., computer-readable medium 179). Instructions embodying the activities or functions described herein may be stored on one or more external computer-readable media. Additionally, such instructions may also, or alternatively, reside at least partially within a memory element (e.g., in main memory 173 or cache memory of processor 172) of machine 170 during execution, or within a non-volatile memory element (e.g., secondary storage 174) of machine 170. Accordingly, other memory elements of machine 170 also constitute computer-readable media. Thus, "computer-readable medium" is meant to include any medium that is capable of storing instructions for execution by machine 170 that cause the machine to perform any one or more of the activities disclosed herein.

Not shown in FIG. 5 is additional hardware that may be suitably coupled to processor 172 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 170 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 170 to appropriately manage the operation of the hardware components therein.

The elements, shown and/or described with reference to machine 170, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described hererin (e.g., the steps shown in FIG. 3) may be implemented in software in, for example, HeNB-GWs 30, 54, 64, and/or 114. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, each of HeNB-GWs 30, 54, 64, and/or 114 is a network or computing device that may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 173, secondary storage 174, computer-readable medium 179) can store data used for the automatic configuration and registration operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 172) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network 10 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving at a gateway element connected to a plurality of network elements an overload message including a traffic load reduction indication ("TLRI") element, wherein the TLRI element indicates a first percentage of traffic to be rejected;
   selecting by the gateway element a number of the network elements to which to relay the received overload message, wherein the number is based on the first percentage of traffic to be rejected;
   modifying the value of the TLRI element in the overload message to indicate that a second percentage of traffic should be rejected; and sending the modified overload message to the selected ones of the network elements.

2. The method of claim 1 wherein the second percentage of traffic is greater than the first percentage of traffic.

3. The method of claim 1, wherein the selecting further comprises:
determining a percentage of the network elements to which to relay the received overload message based on the value of the TLRI element; and
selecting ones of the network elements to which to send the received overload message based on the determined percentage.

4. The method of claim 1, wherein the received overload message comprises a mobility management element ("MME") START message.

5. The method of claim 1 further comprising:
receiving an overload message that does not include the TLRI element; and
sending the received overload message that does not include the TLRI element to a configurable number of the network elements.

6. The method of claim 1, wherein the gateway element comprises a Home eNodeB Gateway ("HeNB-G").

7. The method of claim 1, wherein each of the network elements comprises a Home eNodeB ("HeNB").

8. One or more non-transitory tangible media that includes code for execution and when executed by a processor is operable to perform operations comprising:
receiving at a gateway element connected to a plurality of network elements an overload message including a traffic load reduction indication ("TLRI") element, wherein the TLRI element indicates a first percentage of traffic to be rejected;
selecting by the gateway element a number of the network elements to which to relay the received overload message, wherein the number is based on the first percentage of traffic to be rejected;
modifying the value of the TLRI element in the overload message to indicate that a second percentage of traffic should be rejected; and
sending the modified overload message to the selected ones of the network elements.

9. The media of claim 8, wherein the second percentage of traffic is greater than the first percentage of traffic.

10. The media of claim 8, wherein the selecting further comprises:
determining a percentage of the network elements to which to relay the received overload message based on the value of the TLRI element; and
selecting ones of the network elements to which to send the received overload message based on the determined percentage.

11. The media of claim 8, wherein the received overload message comprises a mobility management element ("MME") START message.

12. The media of claim 8, wherein the operations further comprise:
receiving an overload message that does not include the TLRI element; and
sending the received overload message that does not include the TLRI element to a configurable number of the network elements.

13. The media of claim 8, wherein the gateway element comprises a Home eNodeB Gateway ("HeNB-G") and each of the network elements comprises a Home eNodeB ("HeNB").

14. An apparatus comprising:
a memory element configured to store data; and
a processor operable to execute instructions associated with the data;
wherein the apparatus is configured for:
receiving at a gateway element connected to a plurality of network elements an overload message including a traffic load reduction indication ("TLRI") element, wherein the TLRI element indicates a first percentage of traffic to be rejected;
selecting by the gateway element a number of the network elements to which to relay the received overload message, wherein the number is based on the first percentage of traffic to be rejected;
modifying the value of the TLRI element in the overload message to indicate that a second percentage of traffic should be rejected; and
sending the modified overload message to the selected ones of the network elements.

15. The apparatus of claim 14, wherein the second percentage of traffic is greater than the first percentage of traffic.

16. The apparatus of claim 14, wherein the selecting further comprises:
determining a percentage of the network elements to which to relay the received overload message based on the value of the TLRI element; and
selecting ones of the network elements to which to send the received overload message based on the determined percentage.

17. The apparatus of claim 14, wherein the received overload message comprises a mobility management element ("MME") START message.

18. The apparatus of claim 14, wherein the apparatus is further configured for:
receiving an overload message that does not include the TLRI element; and
sending the received overload message that does not include the TLRI element to a configurable number of the network elements.

19. The apparatus of claim 14, wherein the gateway element comprises a Home eNodeB Gateway ("HeNB-GW").

20. The apparatus of claim 14, wherein each of the network elements comprises a Home eNodeB ("HeNB").

* * * * *